US006432693B1

(12) United States Patent
Hince

(10) Patent No.: US 6,432,693 B1
(45) Date of Patent: Aug. 13, 2002

(54) ADVANCED INORGANIC SOLID-CHEMICAL COMPOSITION AND METHODS FOR ANAEROBIC BIOREMEDIATION

(75) Inventor: Eric Christian Hince, Campbell Hall, NY (US)

(73) Assignee: Geovation Technologies, Inc., Florida, NY (US)

( * ) Notice: Subject to any disclaimer, the term of this patent is extended or adjusted under 35 U.S.C. 154(b) by 0 days.

(21) Appl. No.: 09/439,698

(22) Filed: Nov. 15, 1999

(51) Int. Cl.$^7$ ................................................. B09B 3/00
(52) U.S. Cl. ................................ 435/262.5; 435/262.5; 423/DIG. 17; 210/610; 588/205; 405/129.95
(58) Field of Search ............................. 435/262, 262.5; 423/DIG. 17; 588/219, 205; 71/6; 210/610, 611; 405/128.5, 128.75, 129.95

(56) References Cited

U.S. PATENT DOCUMENTS

| | | | |
|---|---|---|---|
| 5,078,899 A | | 1/1992 | Garrison |
| 5,266,213 A | | 11/1993 | Gillham |
| 5,340,376 A | * | 8/1994 | Cunningham ................. 71/6 |
| 5,411,664 A | | 5/1995 | Seech et al. |
| 5,425,881 A | | 6/1995 | Szejtli et al. |
| 5,567,324 A | | 10/1996 | Rothmel et al. |
| 5,618,427 A | | 4/1997 | Seech et al. |
| 5,789,649 A | | 8/1998 | Batchelor et al. |
| 5,932,472 A | | 8/1999 | Abdullah |
| 6,020,185 A | * | 2/2000 | Hince et al. ............... 435/262 |

OTHER PUBLICATIONS

Baker, K., Bioremediation., "Anoxic/Anaerobic Bioremediation", 1994, pp. 303–304.*
Nadeau, et al., "Aerobic Degradation of 1,1,1–Trichloro-2, 2–Bis(4–Chlorophenyl) Ethane (DDT) by *Alcaligenes eutrophus* A5," Applied and Environmental Microbiology, Jan. 1994, pp 51–55, vol. 60, No. 1.
Aislabie, et al., "Microbail Degradation of DDT and its Residues—A Review," New Zealand Journal of Agricultural Research, 1997, pp 269–282, vol. 40.
Furukawa, et al., "Biochemical and Genetic Basis for the Degradation of Polychlorinated Biphenyls in Soil Bacteria," in Pseudomonas: Molecular Biology and Biotechnology, Galli et al., eds. 1992, pp 259–267. American Society for Microbiology, Washington, DC.
Gan et al., "Disappearance and Crop Uptake of PCBs from Sludge–Amended Farmland," Water Environmental Research, 1994, pp 54–60, vol. 66, No. 1.

Alcock et al., "The Influence of Multiple Sewage Sludge Amendments on the PCB Content of an Agricultural Soil Over Time," Environmental Toxicology and Chemistry, 1995, pp 553–560, vol. 14 No. 4.
Gillham et al., "Enhanced Degradation of Halogenated Aliphatics by Zero–Valent Iron," Ground Water, Nov.–Dec. 1994, pp 958–967, vol. 32, No. 6.
Sayles et al., "DDT, DDD, and DDE Dechlorination by Zero–Valent Iron," Environmental Science and Technology, 1997, pp 3348–3454, vol. 31 No. 12.
Eykholt et al., "Dechlorination of the Chloroacetanilide Herbicides Alachlor and Metolachlor by Iron Metal," Environmental Science and Technology, 1998, pp 1482–1487, vol. 32, No. 10.
Chuang et al., "Zero–Valent Iron–Promoted Dechlorination of Polychlorinated Biphenyls," Environmental Science and Technology, 1995, pp 2460–2463, vol. 29, No. 9.
Agrawal et al., "Reduction of Nitro Aromatic Compounds by Zero–Valent Iron Metal," Environmental Science and Technology, 1995, pp 153–160, vol. 30, No. 1.
Roberts et al., "Reductive Elimination of Chlorinated Ethylenes by Zero–Valent Metal," Environmental Science and Technology, 1996, pp 2654–2659, vol. 30, No. 8.

* cited by examiner

*Primary Examiner*—David A. Redding

(57) ABSTRACT

The present invention discloses the formulation and use of an advanced inorganic solid-media chemical composition designed and intended to enhance the removal of a broad range of contaminants in the environment by provided an improved means of promoting the anaerobic, biologically mediated degradation, transformation, and/or detoxification of the contaminants which may be present in industrial and/or hazardous liquid and solid wastes, and contaminated environmental media such as soils, sediments, groundwaters and surface-water bodies. The disclosed inorganic chemical composition of the present invention provides improved means of (i) promoting and enhancing the biogeochemical reactivity of recalcitrant contaminants in contaminated media, (ii) creating, enhancing, and maintaining anaerobic and strongly reducing conditions (i.e., highly negative Eh values), (iii) providing a source of inorganic electron acceptors, nutrients, surfactants, and chelating and/or acidifying agents to promote the growth of anaerobic contaminant-degrading microorganisms, and (iv) providing sources of inoculum of naturally occurring microorganisms which act to promote the biodegradation of contaminants.

18 Claims, 4 Drawing Sheets

DDT HALF-LIVES IN SOIL: Cohorts S7 - S13X

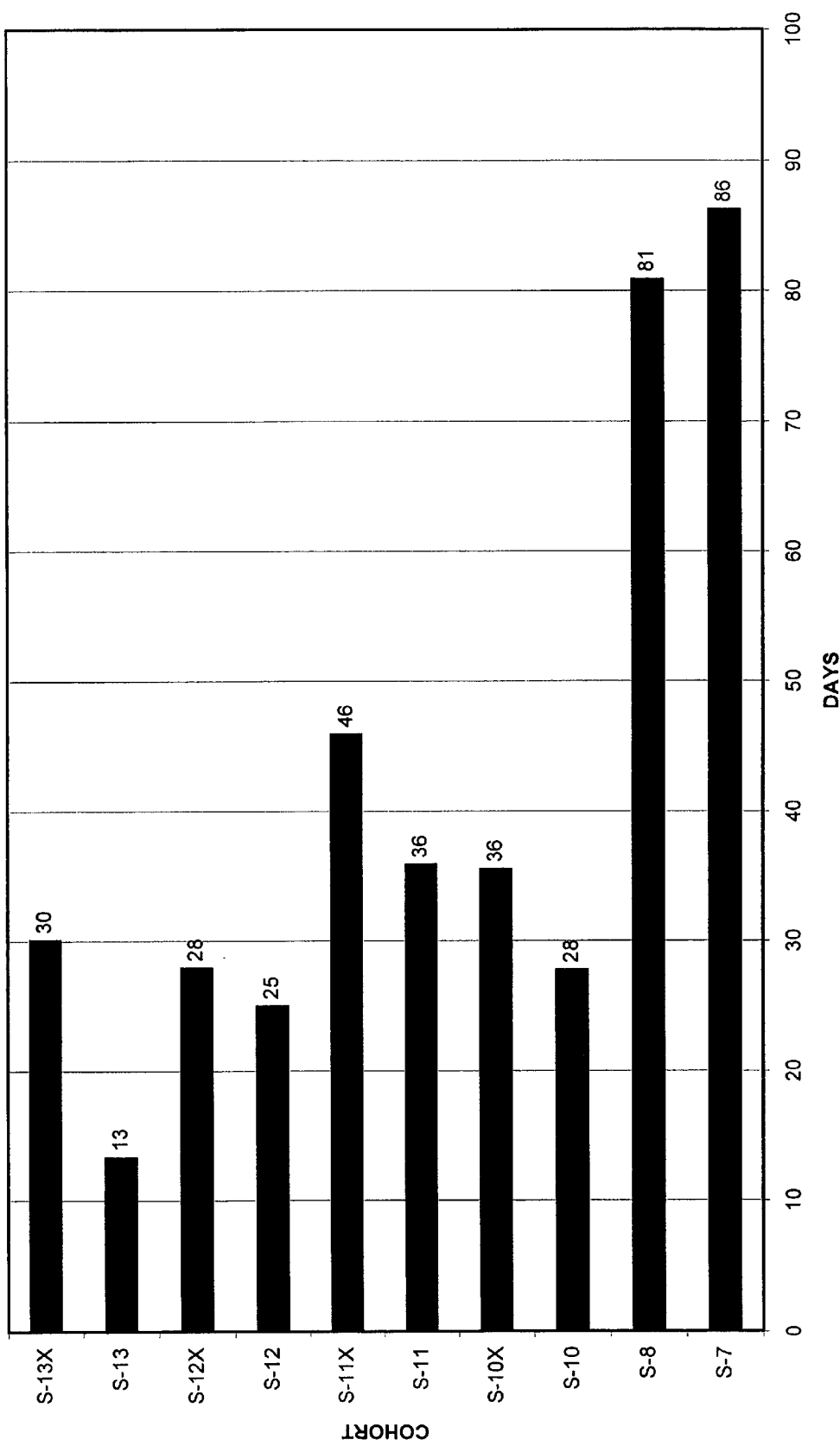

ADVANCED INORGANIC SOLID-CHEMICAL COMPOSITION AND METHODS FOR ANAEROBIC BIOREMEDIATION

CROSS-REFERENCE TO RELATED APPLICATIONS

This invention can be used in conjunction with the liquid- and solid-chemical compositions for anaerobic bioremediation and the means and methods for anaerobic bioremediation disclosed in the pending application of Hince et al., Ser. No. 08/862,782, filed on May 23, 1997, and other applications either filed or to be filed by Hince, and Hince and Singer in November 1999.

BACKGROUND

1. Field of the Invention

This invention discloses the formulation and use of advanced solid-media chemical compositions designed and intended to enhance the removal of halogenated organic contaminants and the oxidized forms of inorganic contaminants from industrial wastes, soils, sediments, sludges, ground waters, surface waters, and the like. In particular, this invention provides an improved means of promoting the anaerobic, biologically mediated degradation, transformation and/or detoxification of a broad range of recalcitrant and/or hydrophobic halogenated organic and inorganic contaminants in the environment, including, but not limited to, organochlorine pesticides such as DDT and toxaphene, arsenic and/or arsenate-based pesticides, polychlorinated biphenyls (PCBs), dioxins, halogenated organic solvents such as perchloroethylene, trichloroethylene, trichloroethane and freon, and toxic inorganic contaminants such as cyanide, hexavalent chromium and the oxidized forms of other toxic heavy metals. This invention provides improved means for (i) promoting the solid-phase extraction of recalcitrant, hydrophobic contaminants from contaminated media and enhancing the bioavailability and biogeochemical reactivity of such contaminants, (ii) creating, enhancing and maintaining both strongly anaerobic and highly reducing conditions favorable to the biodegradation, dehalogenation, transformation and/or detoxification of these contaminants by naturally occurring microorganisms, (iii) providing a source of complex anaerobic electron acceptors, and nutrients to promote the growth of these contaminant-degrading microorganisms, and (iv) providing sources of inoculum of different types of naturally occurring microorganisms which act to directly undertake or indirectly promote the biodegradation, dehalogenation, transformation, and/or detoxification of these contaminants. This invention specifically reveals a cost-effective and relatively simple to use improved inorganic composition, and methods for its use thereof, that is designed to promote one or more of the aforementioned processes in the treatment of environmental contamination.

2. Description of Prior Art

Soil and ground-water pollution caused by chemical contaminants released into the environment is a well documented, world-wide problem. Such chemical contamination is associated with many different types of industrial activities conducted over the last two centuries. Common environmental contaminants include several different types and forms of petroleum hydrocarbons, halogenated organic compounds including solvents (e.g., tetra- and trichloroethene, methylene chloride), pesticides (e.g., DDT and toxaphene), polychlorinated biphenyls (i.e., PCBs) and heavy metals and other inorganic contaminants such as cyanides. The available toxicological data indicates that many of these contaminants, (in particular many of the halogenated organic compounds), are either carcinogenic or potentially carcinogenic to both man and animals. In addition, the available environmental and ecological data have shown that many of these contaminants tend to persist in the environment for long time periods and, consequently, they tend to accumulate in the tissues of biological organisms up the food chain. The long-term stability and extremely slow degradation of many such environmental contaminants presents a substantial, long-term hazard to human health and the environment throughout the industrialized world.

Many of the so-called conventional methods for the remediation or clean-up of chemically contaminated wastes, waters, soils and sediments have generally involved either the physical removal of the contaminated media or the simple mass transfer of the contaminants from one media (e.g., soil) to another (e.g., air). In general, such physical-treatment technologies do not involve the chemically and/or biologically mediated breakdown, transformation or detoxification of the contaminants. Two of the most common categories of physical environmental remediation technologies are the excavation of contaminated soils and the pumping and subsequent treatment of contaminated ground water. The excavation of contaminated soils is often followed by their disposal in a landfill, which can pose a potential long-term risk to the environment. Many ground-water pump-and-treat processes involve the simple mass-transfer or "stripping" of the contaminants from the water into the air. Another common physical-treatment method involves the use of granular activated carbon (GAC) reactors to treat chemically contaminated waters. When contaminated water is passed through a GAC reactor, the contaminants are physically adsorbed onto the carbon particles, thereby producing another contaminated media which requires subsequent disposal and/or treatment. Each of these physical-treatment technologies share the same disadvantage—i.e., they do not reduce the actual amount or toxicity of the chemical contaminants, but rather they simply move the contamination from one place to another or from one media to another.

Another well-known physical treatment process which involves the thermal treatment or incineration of the contaminated materials can be an effective albeit expensive means of breaking down the molecular structure of the contaminants into non-hazardous products. For example, high-temperature incineration is known to be effective for the treatment of materials containing pesticides and PCBS. Thermal-treatment methods require the use of sophisticated and operation-and-maintenance-intensive equipment, the costs of which are passed on to industry in the form of expensive unit costs for soil treatment. In addition, because thermal-treatment processes are rarely, if ever, one-hundred-percent effective in the destruction of the contaminants, they can produce atmospheric emissions of contaminants or the toxic by-products of contaminants. For example, the incomplete incineration of PCBs can produce dioxins, which in turn are significantly more toxic than their "parent" PCB compounds.

A third category of environmental-remediation treatment technologies, bioremediation, involves the use of microorganisms to convert chemical compounds into innocuous or less harmful chemical compounds. Bioremediation technologies generally have lower costs associated with their use and implementation than do the competing physical technologies. Bioremediation technologies are also more adaptable to different types of contamination problems and variations in field conditions than are physical-treatment technologies.

The most promising bioremediation technologies provide the additional capability of treating contaminated media in-situ, i.e., in place, without the need for ground-water pumping or soil excavation. Current trends in bioremediation technology indicate that the most technically feasible and commercially successful bioremediation technologies are those which utilize indigenous or "native" contaminant-degrading bacteria (CDB), fungi and other microorganisms which are naturally present in the contaminated media. The presence of CDB in many different types of environments has been extensively reported in the scientific literature. There is an extensive body of prior art literature and patents concerning various means of using both aerobic and anaerobic CDB (as well as engineered or cultured bacteria) to biodegrade organic contaminants in water, soil and industrial wastes. For example, it has been reported that native Alcaligenes spp., Pseudomonas spp., and Enterobacter spp. can degrade a number of pesticides and polychlorinated biphenyls (Nadeau et al., 1994, *Applied and Environmental Microbiology*; Aislabie et al., 1997, *New Zealand Journal of Agricultural Research*; Galli et al., 1992, *Pseudomonas: Molecular Biology and Biotechnology*). Given the significant advantages of using native microorganisms versus the need to introduce cultured or engineered microorganisms, methods which involve the use of artificially introduced microorganisms (e.g., U.S. Pat. No. 5,932,472) are declining in favor within both the scientific and engineering communities. Recent trends in the art and literature acknowledge a growing understanding of the use of anaerobic biological processes in the treatment of many different types of contaminants that are otherwise recalcitrant under aerobic conditions. In particular, trends in the art reflect a growing understanding of the need and importance of achieving and maintaining anaerobic conditions and other factors which favor the biologically mediated reduction, biodegradation, transformation and/or detoxification of recalcitrant organic and inorganic contaminants in the environment.

The current understanding reflected by the art is that the recalcitrant nature of many halogenated organic contaminants, polynuclear aromatic hydrocarbons (PAHs), other heavy (i.e., high-molecularweight) hydrocarbons, and the like is related to the hydrophobic nature and extremely low solubilities of the contaminants. Consequently, the "bioavailability" of these contaminants, i.e., their availability to biological degradation processes mediated by microorganisms, is extremely limited under most environmental conditions. The prior art describes the use of chemical methods (e.g., Szejtli, et al., U.S. Pat. No. 5,425,881) and thermal methods (e.g., Rothmel, et al., U.S. Pat. No. 5,567,324) to increase bioavailability. For a number of chemically complex hydrophobic chlorinated organic compounds, such as pesticides and PCBs, the prior art has suggested that the higher molecular weight (i.e., more chlorinated) compounds can not be practically biodegraded and thus bioremediation techniques have been all but abandoned with respect to the treatment of such compounds in the environment. For example, through laboratory and pilot-scale experiments directed at the investigation of bioremediation processes on Hudson River sediments contaminated with PCBs, General Electric (GE) researchers determined that the PCBs associated with the sediments consisted of both a labile (i.e., biologically usable) fraction and a resistant (i.e., refractory or relatively non-biologically usable) fraction (General Electric Company, 1992). The labile fraction was described by GE as the lower-molecular weight, less-chlorinated congeners that could be readily desorbed from the sediments. GE described the resistant fraction as the higher-molecular weight congeners that were adsorbed or otherwise bound to the natural organic matrix of the sediments thus greatly limiting their bioavailability to microorganisms. Inoculations with a purified PCB-degrading bacterial strain failed to improve the rate or extent of PCB reduction in the GE experiments. In addition, the GE study did not investigate any means or methods to try to increase the bioavailability of the most recalcitrant PCB congeners. Furthermore, the GE research failed to address or disclose methods or means involving the use of solid or liquid compositions to create and control optimal anaerobic conditions and Eh-pH conditions favorable to the biodegradation of the PCBs. Alternatively, and in contrast to the present invention, further studies along the lines of GE's prior work have all but given up on the biodegradation of the resistant PCB congeners and have instead focused on the potential reduction of the environmental risks posed by these congeners via the long-term biostabilization of these congeners in the sediments (Gan and Berthouex, 1994; Alcock et al., 1995). These studies have further suggested that PCB biodegradation continues to occur slowly over an extended time frame as specific PCB congeners become bioavailable (Gan and Berthouex, 1994; Alcock et al., 1995).

Unlike the present invention, U.S. Pat. No. 5,789,649 to Batchelor et al. (E.I. du Pont de Nemours and Company) discloses a means for the degradation of contaminants in soil consisting of adding both a "stabilizing agent" and a "reductive zero-valent metal and metal catalyst." In the process disclosed by Batchelor et al. (U.S. Pat. No. 5,789,649), the contaminants are first stabilized within the solid matrix using a "stabilizing agent," such as that comprised of mixtures of bentonite clay and iron chloride. Batchelor et al. (U.S. Pat. No. 5,789,649) further disclose the use of a "reductive zero-valent metal and metal catalyst" which provides for a "metallic couple" which leads to the reductive dehalogenation of the halogenated organic compounds and the consequent reduction of their concentration. Current understanding, however, reflects the need to extract, desorb, solubilize or otherwise remove the contaminants from the solid or non-aqueous phases in order to increase the bioavailability of the halogenated compounds to microorganisms to facilitate their biodegradation. Batchelor et al. (U.S. Pat. No. 5,789,649) do not disclose the chemical compositions, methods or means of the present invention.

U.S. Pat. No. 5,266,213 to Gillham and peer-reviewed literature by Gillham and O'Hannesin (Ground Water, 1994) disclose a remediation process limited to the treatment of ground water contaminated with chlorinated aliphatic compounds wherein the contaminated water is fed through a trench or tank containing a metal, such as iron fillings, under strict exclusion of oxygen (Eh values −100 to −200 mV). The contaminant breaks down under such reducing conditions into innocuous by-products. Based on the results of tests in which sodium azide was added to the columns, Gilham et al. concluded that the degradation process was abiotic in nature. Gillham (U.S. Pat. No. 5,266,213) opined that the degradation process involved the abiotic, electro-chemical reduction of the iron and the associated reductive dechlorination of the organic compounds from the electrons produced by the reduction of the iron. However, the present invention discloses compositions and methods whereby iron reduction (and the reduction of other metals) coupled to the reductive-dehalogenation of organic contaminants is a biologically mediated process. Therefore, Gillham (U.S. Pat.

No. 5,266,213) and Gillham and O'Hannesin (Ground Water, 1994) do not disclose the present invention.

Sayles et al. (*Environmental Science and Technology*, 1997) investigated the utility of using zero-valent iron (e.g., granular iron filings and the like) to dechlorinate DDT and related compounds in an anaerobic aqueous environment. Sayles et al. also acknowledged the importance of providing for a large surface-area of reactive iron, such as that which could be facilitated by the use of a fine particulate or powdered forms of iron. Sayles et al. also investigated the use of a surfactant to increase the availability of DDT to the "chemical" reactions catalyzed by the zero-valent iron. Like Gillham (U.S. Pat. No. 5,266,213) and Gillham and O'Hannesin (Ground Water, 1994), Sayles et al. do not disclose the use of more than a single inorganic amendment (i.e., in addition to the iron) to help optimize or control Eh-pH conditions. Like Giliham (U.S. Pat. No. 5,266,213) and Gillham and O'Hannesin (Ground Water, 1994), Sayles et al. also fail to acknowledge, investigate or otherwise disclose biologically mediated reductive-dehalogenation methods, means or compositions. Therefore, Sayles et al. does not disclose the present invention.

U.S. Pat. Nos. 5,411,664 and 5,618,427 to Seech et al. (W. R. Grace) disclose practically identical methods for the respective biodegradation of halogenated aromatic compounds (US. Pat. No. 5,411,664) and nitroaromatic compounds (U.S. Pat. No. 5,618,427). Both patents disclose the use of both fibrous organic matter and multi-valent metal particles to the contaminated media. These patents discuss adding these amendments to soil, water, or sediments and subsequently incubating these media under anaerobic conditions conducive to the growth of the indigenous contaminant-degrading microorganisms. The patents to Seech et al. disclose that the fibrous nature of the plant materials used is important to enable the organic contaminant to become absorbed into the fibrous structure of the plant material which enhances the extent of contaminant removal from the environmental media. Seech et al. also disclose the use of multi-valent metals, (preferably iron or magnesium), in combination with the fibrous plant matter wherein the multi-valent metals are specifically capable of being both oxidized and reduced back and forth under normal environmental conditions. Seech et al. do not discuss or disclose the potential problems associated with the precipitation of metallic oxyhydroxides and metallic carbonates or the tendency of such precipitates to lead to unfavorable Eh-pH conditions for the anaerobic, reductive dehalogenation of recalcitrant organic contaminants, let alone methods, means or compositions to overcome these problems. Consequently, Seech et al. do not disclose the present invention.

U.S. Pat. No. 5,078,899 to Garrison (Idaho Research Foundation, Inc.) discloses a method of treating mine drainage water to remove ferric hydroxide, which is not the subject of the present invention. Although Garrison (U.S. Pat. No. 5,078,899) does not disclose the present invention, the present invention provides for the beneficial use of the wastes produced by the oxidation of mine drainage waters, e.g., ferric oxyhydroxides and the like, as a component of the inorganic chemical composition disclosed herein.

SUMMARY OF THE INVENTION

In accordance with the present invention there is provided novel and improved solid-chemical compositions and associated methods and means for the use of said compositions to promote the anaerobic, biologically mediated, degradation, transformation, and/or detoxification of recalcitrant organic and inorganic environmental contaminants present in solid and liquid wastes, soils, sediments, and water into non-hazardous and/or less hazardous by-products. The principles of this invention provide for the relatively rapid and cost-effective anaerobic, biologically mediated decontamination of halogenated solvents such as tetrachloroethene (PCE), trichloroethene (TCE), 1,1,1-trichloroethane (1,1,1-TCA), freon and the like; other recalcitrant halogenated organic compounds such as DDT, toxaphene, PCBs, dioxins, and the like; arsenic-based pesticides; and recalcitrant inorganic contaminants such as cyanides, hexavalent chromium, the oxidized forms of other toxic transition metals, and the like.

A further object of the invention is to present means by which to overcome the disadvantages associated with not only the traditional methods of remediation previously described, but also the limitatioris of other more recent and/or technically advanced methods and means of chemical-reduction based remediation and bioremediation described in the prior art. The present invention has the further advantage that it can be used effectively either ex-situ or in-situ. A preferred embodiment of the present invention offers the further advantage of providing a means of promoting the bioremediation of contaminated sediments in-situ beneath bodies of natural water such as oceans, lakes, rivers, streams, and the like, and man-made water bodies such as waste-treatment lagoons and the like. The present invention also provides for significant cost savings relative to other means and methods for environmental remediation, as it can reduce or eliminate the need for excavation, pumpage, transportation, and/or off-site treatment of contaminated wastes, soil, or water.

The present invention is based upon discoveries from recent and ongoing experiments that several inter-related conditions must be achieved and maintained within the matrix of the contaminated media to enable the effective biodegradation of recalcitrant organic contaminants in the environment. Accordingly, the purpose of the present invention is to provide a solid-chemical composition and methods and means for the use thereof which specifically act to: (1) increase the biogeochemical reactivity and bioavailability of the contaminants; (2) create and maintain strongly anaerobic conditions by facilitating the biologically mediated removal of the available oxygen from the media; (3) create and maintain optimal Eh-pH conditions including strongly negative Eh conditions (Eh values<−200 millivolts) and near neutral to slightly acidic pH conditions ($6 \geq pH \geq 8$) which favor anaerobic, biologically mediated chemical-reduction reactions, e.g., the reductive dehalogenation of halogenated organic contaminants; and (4) provide means for maintaining conditions (1)–(3) for sufficiently long periods of time to enable the biologically mediated degradation, transformation, and/or detoxification reactions to proceed to the extent that the concentrations and/or toxicity of the contaminants are reduced to acceptable levels.

The disclosed solid-chemical compositions provide various forms of electrons, organic and inorganic electron acceptors and nutrients, organic and inorganic substrates for microorganisms as well as optional inorganic nutrient forms of nitrogen and phosphorus and optional chelating and acidifying agents. The discoveries disclosed herein indicate and/or strongly suggest that such contaminants can be effectively degraded, transformed and/or detoxified by indigenous, contaminant-degrading bacteria when the solid-chemical composition disclosed herein is applied to the contaminated media and the media are subsequently maintained under conditions favorable to the anaerobic microorganisms and the biogeochemical reactions mediated by these organisms, i.e., the media are kept moist or nearly saturated with water.

These and other objects and advantages of the present invention will become apparent to those skilled in the art following the detailed description of the invention which reveals the novel combination of solid chemical compositions described herein, and more particularly as defined by the appended claims.

BRIEF DESCRIPTION OF THE FIGURES

Embodiments of the present invention will now be described more fully with reference to the following drawings in which;

FIG. 4 shows the effect of several different embodiments of the disclosed chemical compositions on toxaphene biodegradation rates.

DETAILED DESCRIPTION OF THE INVENTION

Figure 1:
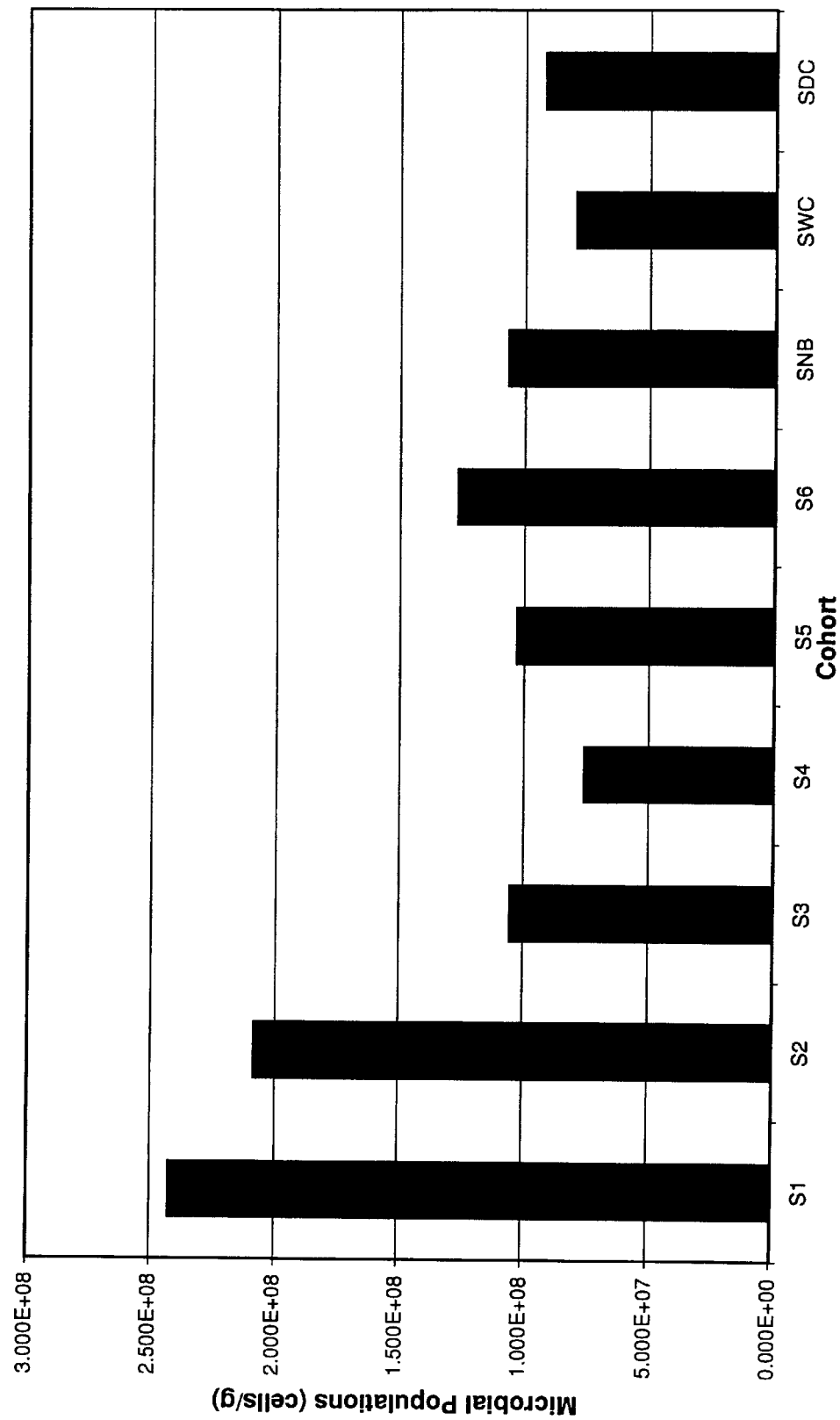
FIG. 1 shows the effect on microbial populations as a result of treatment with several simplified embodiments of the disclosed chemical composition in accordance with the present invention.

The present invention disclosed herein provides unique solid-chemical compositions for the bioremediation of wastes and environmental media contaminated with recalcitrant organic and inorganic contaminants. In the practice of the present invention, the disclosed solid-chemical compositions would first be prepared by mixing their components together prior to their use at a contaminated site. Next, the disclosed solid-chemical compositions are applied to, and ideally, mixed into the contaminated media (e.g., sludges, solid and/or liquid wastes, and the like), contaminated soil, sediment, or water, and the like, to promote the anaerobic biodegradation, transformation, or detoxification of the contaminants within said media.

The use as intended of the disclosed solid-chemical compositions provide for a combination of means, mechanisms, processes, factors, and capabilities which enhance the anaerobic biodegradation, transformation, and/or detoxification of recalcitrant environmental contaminants including:

(1) The solid-chemical compositions disclosed herein provide multiple and complimentary sources of inorganic electron acceptors for metal-reducing bacteria such as Geobacter spp., Geovibrio spp., Pelobacter spp., Shewanella spp., Pseudomonas spp., Achromobacterspp., Aeromonas spp., Bacillus spp., Enterobacterspp., Desulfuromonas spp., Desulfovibrio spp., Micrococcus spp. and other metal-reducing microorganisms in the forms of both iron and manganese metallic materials, iron (III) and manganese (IV) containing minerals and biogeochemically produced ferric oxides, hydroxides and oxyhydroxides.

(2) The solid-chemical compositions disclosed herein provide multiple and complimentary sources of electrons which act to create and maintain reducing conditions (Eh values $\geq -200$ millivolts) within the matrix of the contaminated media, which in turn helps to catalyze anaerobic, biologically mediated chemical-reduction reactions which promote the biodegradation, transformation and/or detoxification of recalcitrant contaminants.

(3) The solid-chemical compositions disclosed herein also include the use of special types and proportions of inorganic, manganese-containing metals and/or mineral particles which serve as oxidative catalysts for the selective and/or site-specific biogeochemical and/or electrochemical formation, precipitation and/or deposition of metallic oxides, oxyhydroxides, sulfides, carbonates, and the like which would otherwise tend to precipitate onto the surfaces of the inorganic electron-acceptor amendments under the typical Eh-pH conditions created by the use of the solid-chemical compositions disclosed herein. This latter advantage of the present invention represents a major and extremely important advancement in the art, as the metallic manganese and/or manganese (IV) mineral particles provide a means of preserving the availability of the iron-containing inorganic electron acceptors such that highly reducing and relatively stable Eh conditions are maintained for long periods of time relative to other means and methods disclosed in the prior art. Hence, the inorganic solid-chemical compositions disclosed herein provide unique advantages which greatly enhance the speed and effectiveness of the anaerobic, biologically mediated reductive dehalogenation of recalcitrant organic contaminants and the biologically mediated reduction of inorganic contaminants.

(4) In addition to the foregoing, and for purposes of explanation and not limitation, the biogeochemically produced (i.e., 'biogenic') ferric oxides, hydroxides and oxyhydroxides included in the solid-chemical compositions disclosed herein are believed to provide a source of inoculum for metal-reducing bacteria. The biogenic ferric oxides, hydroxides and oxyhydroxides included in the disclosed composition also provide a supplemental source of electrons, ferric-iron electron acceptors and inorganic substrates for such metal-reducing microorganisms.

Based on the foregoing and in accordance with the present invention, there are provided means for the enhanced anaerobic microbial degradation, transformation, and/or detoxification of recalcitrant organic and inorganic chemical contaminants in wastes, soils, sediments, and comprising the formulation, processing and use of unique solid-chemical compositions. The inorganic solid-chemical composition of the present invention is comprised of the powdered or fine-granular forms of inorganic, biogenic and/or industrially-processed metals, minerals, or metallic solids. In the preferred embodiment of the present invention, the composition includes an essential first component comprised of the fine granular and highly porous forms of metallic iron or steel and a second essential component comprised of similar forms of metallic manganese and/or minerals containing manganese (IV). A third inorganic component of the disclosed composition is comprised of one or more biogeochemically produced (i.e., biogenic) forms of ferric oxides, hydroxides and oxyhydroxides. Additional inorganic components would be selected from the groups comprising nitrate salts, ringed metaphosphates and/or linear polyphosphates, and chelating and/or acidifying agents.

In the preferred embodiment of the present invention, the first component (a) constitutes from 25% to 99% of the total solid-chemical composition by weight and is selected from the group comprised of the fine granular and/or powdered forms of porous iron or steel, e.g., the "sponge" iron product Ancor Image 100 manufactured by Hoeganaese and/or the like. The first inorganic component serves as the primary inorganic source of electrons and anaerobic, low-Eh electron acceptors, e.g., ferric iron, for iron-reducing bacteria such as Geobacterspp., Geovibrio spp., Pelobacter spp., Shewanella spp., Pseudomonas spp., Achromobacter spp., Aeromonas spp., Bacillus spp., Enterobacter spp., Desulfuromonas spp., Desulfovibrio spp., Micrococcus spp., and other microorganisms capable of iron-reduction. The first component also serves as an inorganic substrate for said anaerobic, metal-reducing microorganisms. The aforementioned "sponge" form of fine-granular iron or steel is the preferred embodiment because of its high surface area and porosity relative to its particle size.

In the preferred embodiment of the present invention, the second component (b) constitutes from 1% to 42.5% of the total composition by weight and is selected from the group comprised of the fine granular and/or powdered forms of metallic manganese and/or manganese-(IV)-containing minerals such as pyrolusite, psilomelane, and the like. In addition, it is critical that the proportion of the second (i.e. manganese) component relative to the first (i.e., iron) component is such that the weight ratio of the said second-to-first components is in the range of 0.01–0.75. The principle function of the secondary (i.e., manganese) component is that it serves as a oxidative catalyst for the selective and/or site-specific biogeochemical and/or electrochemical formation, precipitation and/or deposition of metallic oxides, oxyhydroxides, sulfides, carbonates and the like. An additional function of the second inorganic component is that it serves as an additional source of electrons and anaerobic-electron acceptor forms of manganese (IV) for manganese-reducing and other metal-reducing microorganisms capable of manganese-reduction. The second inorganic component further serves as an additional inorganic substrate for anaerobic, metal-reducing microorganisms.

In the preferred embodiment of the present invention, a third component (c) constitutes from 0.01% to 15% of the total composition by weight and is selected from the group comprised of biogeochemically produced ferric oxides, hydroxides and oxyhydroxides, such as those associated with acid-mine drainage and/or the treatment by-products thereof. A further distinction of the aforementioned preferred embodiment of the present invention is that such materials would be of the type referred to as "yellow boy" and related materials which are products or byproducts of mine drainage wastes and/or the treatment thereof. For purposes of clarification and not limitation, results of the novel research associated with the present invention suggests that in addition to providing another source of electrons and ferric-iron electron acceptors for metal-reducing bacteria, such biogeochemically produced ferric-iron containing materials also serve as inoculum for metal-reducing and oxidizing bacteria such as Geobacter spp., Thiobacillus spp., and the like. Component (c) also provides an additional source of inorganic substrate for said anaerobic, metal-reducing microorganisms.

In the preferred embodiment of the present invention, a fourth component (d) of the solid-chemical composition constitutes 0.5% to 40% of the total composition by weight and is selected from the group comprised of sodium nitrate, sodium-potassium nitrate, potassium nitrate and ferric nitrate. The fourth optional component provides both a source of electron acceptors for denitrifying bacteria and other anaerobic microorganisms capable of denitrification and an ammonium-free source of nitrates as the sole inorganic nutrient form of nitrogen in the solid-chemical composition.

In the preferred embodiment of the present invention, a fifth component (e) constitutes 0.25% to 20% of the total composition by weight and is selected from the group comprising ringed metaphosphates and/or linear polyphosphates. Component (e) provides a source of complex, hydrolyzable phosphates as nutrients for anaerobic microorganisms. The provision of complex metaphosphates and/or polyphosphates provides nutrient phosphorus in forms which are relatively non-reactive geochemically and hence more effectively and efficiently utilized by microorganisms. In addition, these complex phosphates also serve as surfactants which enhance the biogeochemical reactivity and bioavailability of organic contaminants.

In the preferred embodiment of the present invention, the sixth component (f) constitutes from 0.01% to 5% of the total composition by weight and is selected from one or more of the group comprising citric acid, humic acid, fulvic acid, sodium citrate, nitrilotriacetic acid (NTA), and ethylenediaminetetraacetic acid (EDTA) and any combinations thereof. Component (f) of the disclosed composition provides a source of both chelating agents and acidifying agents which help promote anaerobic, biologically mediated metal-reduction processes and other biogeochemical processes which are catalyzed by metals. In the preferred embodiment of the present invention, citric acid is used as some or all of component (f) given that it is not only an effective chelating and pH-reducing (i.e., acidifying) agent, but it is a weak organic acid which can help promote microbial processes. The use of humic and/or fulvic acid in component (f) provides similar and complimentary benefits to the use of citric acid.

The solid-chemical composition of the present invention provides multiple inorganic sources of electrons, electron acceptors, substrates, nutrients, and inoculum for anaerobic, metal-reducing bacteria such as Geobacterspp., Geovibrio spp., Pelobacterspp., Shewanella spp., Pseudomonas spp., Achromobacter spp., Aeromonas spp., Bacillus spp., Enterobacter spp., Desulfuromonas spp., Desulfovibrio spp., Micrococcus spp., and other microorganisms capable of iron reduction, manganese reduction, and the reduction of other metals. Based on information found in the recent literature and the research conducted by the inventors, it is believed that the aforementioned metal-reducing microorganisms play an important if not preeminent role in the anaerobic, biologically mediated degradation, transformation, and/or detoxification of recalcitrant contaminants in the environment.

A specific advantage provided for by the unique formulation of the solid-chemical composition disclosed herein is that it serves to create, enhance and maintain highly reducing (i.e., Eh≧−200 millivolts) conditions within the matrix of contaminated media to which it is applied. Specific means for the maintenance of the highly reducing conditions is provided for by the use of the second component, i.e., fine particles of metallic manganese and/or minerals containing manganese (IV), which serve to catalyze the selective and/or site-specific biogeochemical and/or electrochemical formation, precipitation, and/or deposition of metallic oxides, oxyhydroxides, sulfides, carbonates, and the like. The said use as intended of the second geochemical amendment is one of the most important advantages of the present invention over what has previously been disclosed in the prior art. In particular, the use as intended of the second geochemical amendment causes inorganic minerals such as metallic oxides, oxyhydroxides, sulfides, carbonates, and the like to form at or near the surfaces of the metallic manganese and/or minerals containing manganese (IV) instead of at or near the surfaces of the first inorganic amendment (i.e., sponge-iron particles). The biogeochemical conditions which typically arise from the use of the chemical compositions are such that metallic oxides, oxyhydroxides, sulfides, carbonates, and the like would normally tend to form at or near the surfaces of the sponge-iron particles. However, the use of this second inorganic amendment, i.e., metallic manganese or Mn(IV)-containing minerals, acts to control and direct the location of the deposition of the metallic oxides, oxyhydroxides, sulfides, carbonates, and the like away from the surfaces of the sponge-iron particles, leaving the surfaces of the spongeiron particles available to iron-reducing and other metal-reducing microorganisms thereby maintaining relatively stable, low-Eh conditions (e.g., Eh values≧−200 millivolts) within the contaminated media being treated. Recent experimental data concerning the present invention indicates that it is essential that the disclosed amounts and proportions of this second inorganic amendment relative to the first inorganic amendment be strictly maintained.

Recent experimental data has shown that the use of the second inorganic component, i.e., the metallic manganese or Mn(IV)-containing minerals in the proportions specified herein, provides an effective means of maintaining the bioavailability of the first and third inorganic components of the composition, i.e., the sponge iron and ferric oxyhydroxides, which consequently provides for the long-term maintenance of highly reducing conditions (e.g., Eh values≧−200 millivolts) which promote the anaerobic, biologically mediated chemical-reduction processes and reactions which in turn drive the biodegradation, transformation, and/or detoxification of recalcitrant contaminants. Accordingly, the enhancement and long-term maintenance of anaerobic and reducing conditions provided for by the use of the solid-chemical composition disclosed herein provides for the more rapid and effective biodegradation, transformation and/or detoxification of recalcitrant organic and inorganic contaminants present in solid and liquid wastes, soils, waters or sediments. For purposes of explanation and not limitation, it is also believed that the solid-chemical composition has the capacity to enhance the biogeochemical reactivity of recalcitrant hydrophobic contaminants from contaminated media, to enhance the solid-phase extraction of said contaminants by other compositions, and to greatly enhance the anaerobic biodegradation, transformation and/or detoxification of contaminants via the aforementioned promotion and maintenance of strongly anoxic and highly reducing conditions.

In the practice of the present invention, the solid-chemical composition is applied to the contaminated environment at rates that are typically within the range of 0.05 g to 50 g per Kg of contaminated solid or liquid waste, soil, sediment or water. In general, it is desirable to apply the composition at a rate in which the mole-equivalent mass is more than two-to-five times greater than the mole-equivalent mass of the contaminants in the contaminated media. For applications in which the disclosed composition is applied to industrial and/or hazardous liquid and solid wastes, the dose rate may need to be increased to the range of 5 g to 500 g per Kg of such wastes. Ideally, the composition would be applied at a rate that is at least ten times greater than the mole-equivalent mass of the contaminants in the contaminated media.

The chemical compositions of the present invention disclosed herein can be applied to contaminated media either ex-situ or in-situ to enhance the bioavailability and/or reactivity of recalcitrant organic and inorganic contaminants and to promote the anaerobic biodegradation, transformation, and/or detoxification of these contaminants. In addition, the preferred embodiments of the present invention allow for the chemical compositions disclosed herein to be combined and/or processed into such forms that can easily be applied to the contaminated environment in-situ, eliminating the need to excavate the materials and treat in an ex-situ manner. In the practice of the present invention, after the disclosed solid-chemical compositions have been applied to the contaminated media, the media would ideally be maintained under conditions favorable for anaerobic microbial growth, i.e., at a moisture content preferably close to 100% of the saturation point or water-holding capacity of the soil or sediment, after the introduction of said chemical compositions.

Another advantage of the solid-chemical composition is that it may be used either alone or in combination with other materials within the treatment media of so-called "permeable reactive barriers" (PRBs), which are increasingly being utilized for ground-water remediation applications and the like. Similarly, the solid-chemical composition may also be used in above-ground waste-water treatment systems, such as fluidized-bed reactors, flow-through reactors, filtration systems and the like to treat contaminated ground-waters, waste-waters, industrial-process water streams and the like.

Another aspect of the preferred embodiment of the present invention is the means and/or methods by which the chemical compositions disclosed herein are processed into the forms of pellets, capsules or tablets, which are easier to store, handle and use than other forms of the disclosed chemical compositions. In the preferred embodiment of the present invention in which the chemical compositions disclosed herein are processed into the form of pellets, capsules or tablets, it may be necessary or otherwise advantageous to use either organic or inorganic processing or binding agents in the manufacture of the pellets, capsules or tablets. In the preferred embodiment of the present invention, the optional organic processing or binding agents would be selected from the group comprising starch, molasses, barley malt extract, corn syrup, vegetable and/or animal fats or lards, glycerin, gelatine and the like in the proportions of from 0.5% to 7% of the total composition by weight. In the preferred embodiment of the present invention, the optional inorganic processing or binding agents would be selected from the group comprising bentonite, montmorillonite, kaolinite, calcium carbonate, portland cement (i.e., concrete) and the like in the proportions of from 0.5% to 7% of the total composition by weight. In the embodiment of the present invention whereby such organic and/or inorganic processing or binding agents are used in the manufacture of pellet, capsule or tablet forms of the disclosed chemical compositions, the relative amounts of the components of the disclosed compositions would be adjusted downward in a manner which retains the relative proportions of these components.

The preferred embodiment of the present invention in the form of manufactured pellets, capsules and/or tablets is similar in form to those manufactured for the animal feed and pellet-fuel industries, such that this form of the present invention can be readily produced by existing and economical means. The preferred embodiment of the present invention in the form of manufactured pellets, capsules and/or tablets provides means by which the disclosed compositions are easier and safer to store, handle, and use than other forms of both the disclosed compositions and other means, methods and compositions for bioremediation disclosed in the prior art. Another aspect of the preferred pellet, capsule, or tablet forms of the solid chemical compositions disclosed herein is that the final specific gravity (i.e., density) of the pellets can easily be adjusted so as to be greater than that of water, such that the pellets readily sink in water. In addition, the pellet, capsule, or tablet forms of the compositions disclosed herein provides for the delayed, time-release type of interaction between the compositions and the contaminated media-consequently these forms provide for the prolonged release of the various amendments incorporated into the compositions. Hence, the pellet, capsule, or tablet forms of the disclosed chemical compositions would provide the means by which to utilize the compositions in more complicated applications, such as in the bioremediation of contaminated sediments in-situ beneath natural waters (e.g., oceans, lakes, rivers, streams, and the like) and man-made water bodies (e.g., waste-treatment lagoons and the like).

As described above, the solid chemical-compositions of the present invention disclosed herein provide for unique advantages, means and methods of achieving the relatively rapid and effective anaerobic bioremediation of recalcitrant organic and inorganic contaminants present in wastes, soils, waters, or sediments versus the means and methods disclosed in the prior art. The solid-chemical compositions disclosed herein and the means and methods for their intended use overcome many of the disadvantages associated with traditional remediation methods by providing for the efficient and cost-effective remediation of environmental contaminants on a commercial scale with minimal disturbance to the contaminated area. The solid-chemical compositions disclosed herein and the means and methods for their intended use also overcome many of the disadvantages associated with the more advanced means and methods for the chemical and biological remediation of environmental contaminants disclosed in the prior art.

EXAMPLES

The following examples are provided to illustrate the technical basis, merits and unique advantages provided by the present invention with respect to the treatment of soils contaminated with some of the most extremely recalcitrant contaminants, namely the organo-chlorine pesticides DDT and toxaphene. These examples are not to be construed as limiting the present invention in any way, but are merely presented as examples of the unique advantages and non-obvious improvements of the present invention over the prior art and to illustrate the practice of the present invention as described in the appended claims.

Example 1

A set of lab-scale experiments were conducted from December 1998 to July 1999 to investigate under more controlled conditions in the laboratory the effectiveness of using different geochemical compositions to promote the anaerobic biodegradation of the pesticides DDT and toxaphene. These experiments evaluated trends in pesticide concentrations, nutrient levels, Eh-pH conditions and microbial populations in response to a variety of different geochemical compositions in combination with a liquid-chemical composition previously disclosed by Hince et al. (pending patent application Ser. No. 08/862,782). One of the primary research interests of these experiments involved the quantitative determination of microbial populations via the use of direct-count, epi-fluorescence light microscopy techniques. The results (FIG. 1) indicated that the most significant increases in bacterial populations were observed in experimental cohorts S-1 and S-2, which involved different embodiments of the inorganic chemical composition disclosed herein, i.e., different types of granular iron combined with pyrolusite (i.e., manganese dioxide), versus other combinations of geochemical and/or mineral amendments. These results provided extremely important evidence that the reduction of iron and manganese under these conditions was microbially mediated and not an abiotic process. In addition, significant shifts in the dominant morphologies of the microorganisms isolated from Cohorts S-1 and S-2 were observed over time, which is consistent with the adaptation of these microbial communities to both the pesticides and the amendments.

Example 2

Figure 2:
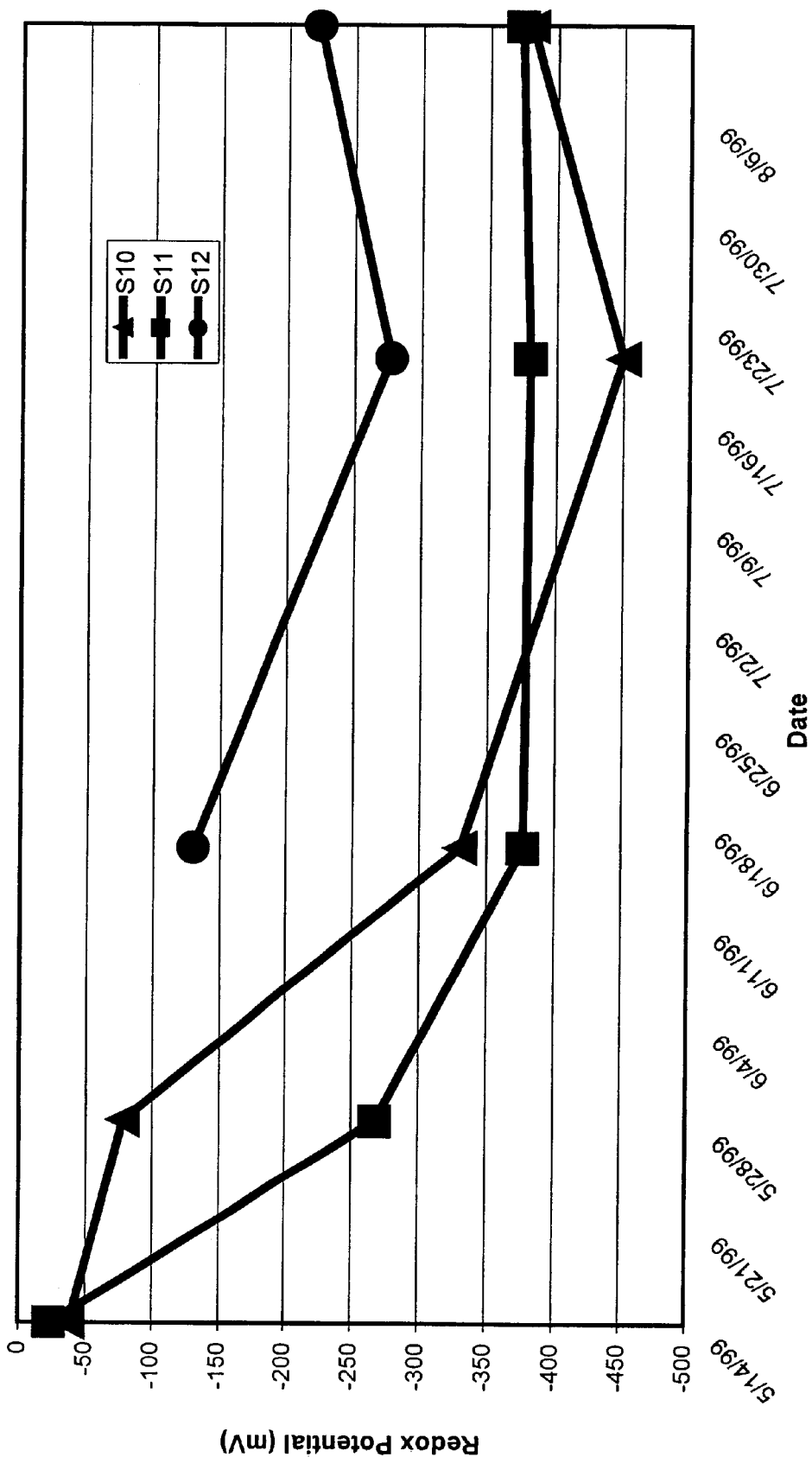
FIG. 2 illustrates the effectiveness of several different embodiments of the disclosed chemical compositions of the present invention with respect to control of redox conditions (Eh).

Subsequent to the experiments described above, several additional sets of bench-scale, microcosm experiments were conducted in the laboratory to investigate the effectiveness of the use of different embodiments of the solid-chemical composition disclosed herein both alone and in combination with several different embodiments of an organic solid-chemical composition to facilitate the biodegradation of the pesticides DDT and toxaphene. In addition, both a previously disclosed liquid-chemical composition (Hince et al., pending patent application Ser. No. 08/862,782) and a novel liquid-chemical composition were used in these experiments. As shown in FIG. 2, experimental cohorts S-10 and S-11 exhibited negative Eh values immediately after treatment followed by a rapid decline in Eh values which stabilized within the range of −300 to −400 millivolts approximately one month after treatment. The most successful cohorts, S-10 and S-11, were treated with a simplified organic amendment in combination with a consistent embodiment of the chemical composition disclosed herein comprised of the following components: (i) Ancor Image 100 "sponge iron," a highly porous form of fine granular iron manufactured by the Hoeganaes Corporation, (ii) pyrolusite (i.e., manganese dioxide), and (iii) "yellow boy" (i.e., a biogenic solid comprised of ferric oxides, hydroxides and oxyhydroxides obtained from an mine drainage site in Pennsylvania) within the specified concentration ranges and proportions of the present invention as disclosed herein.

Figure 3:
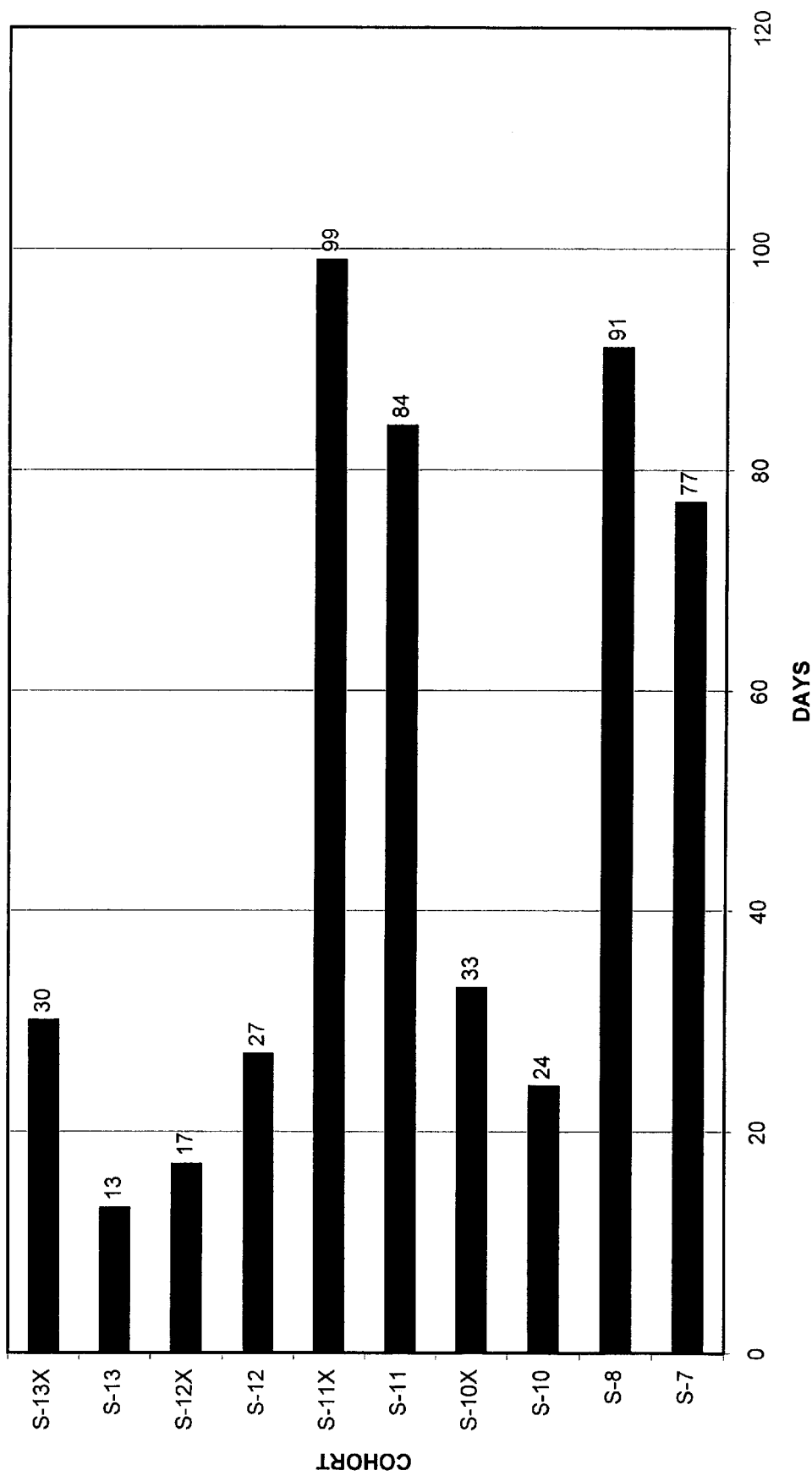
FIG. 3 shows the effect of several different embodiments of the disclosed chemical compositions of the present invention on DDT biodegradation rates.

The observed trends in pesticide degradation were found to closely follow the observed trends of low-Eh conditions (and the stabilization thereof). As shown in FIGS. 3 and 4, cohorts S-7 and S-8, which were only treated with an inorganic embodiment of the solid-chemical composition disclosed herein and/or a liquid-chemical composition previously disclosed by Hince et al. (pending patent application Ser. No. 08/862,782) demonstrated half-lives on the order of a minimum of three months. Cohorts S-10X, S-11X and S-12X, which were only treated with the simplified organic amendment and a previously disclosed liquid-chemical composition (Hince et al., pending patent application Ser. No. 08/862,782) achieved better treatment half-times which ranged from 17-to-99 days for DDT and 28-to-46 days for toxaphene. Cohorts S-10, S-11 and S-12, which were also treated with the aforementioned embodiment of the solid-chemical composition disclosed herein and either novel and/or previously disclosed liquid-chemical compositions, achieved better results (overall) with treatment half-times ranging from 24–84 days for DDT and 25–36 days for toxaphene. These data indicate or suggest that the inorganic chemical composition disclosed herein enhances pesticide biodegradation by enhancing the biogeochemical reactivity of the pesticides. The data also indicate that the disclosed composition provides the specific advantage of helping to create and maintain stable low-Eh conditions for extended time periods which enhances the speed and effectiveness of contaminant biodegradation.

The invention has been described with reference to particular embodiments. However, it should be obvious to those skilled in the art to which this invention pertains that other modifications and enhancements can be made without departing from the scope of the claims that follow.

I claim:

1. A solid-chemical composition, comprising:
   a. A source of iron, being one or more selected from the group consisting of metallic iron particles and steel particles, from about 25% to 99%, by weight percent, of said composition;
   b. A source of Mn(IV), being one or more selected from the group consisting of metallic manganese particles and particles of manganese (IV) minerals, from about 1% to 42.5%, by weight percent, of said composition.

2. A solid-chemical composition in accordance with claim 1, whereby said composition provides the capacity to create and maintain anaerobic and reducing conditions so as to promote the anaerobic bioremediation and chemical reduction of chemical contaminants in environmental media.

3. A chemical composition in accordance with claim 1, wherein said source of iron serves as a reducing agent and a microbial electron acceptor for anaerobic respiration.

4. A chemical composition in accordance with claim 1, wherein said source of Mn(IV) serves as an oxidative catalyst and a microbial electron acceptor for anaerobic respiration.

5. A chemical composition in accordance with claim 1, further comprising a source of biogeochemically produced minerals, being one or more selected from the group consisting of iron oxides, iron hydroxides and iron oxyhydroxides, from about 0.01% to 15%, by weight percent, of said composition.

6. A chemical composition in accordance with claim 1, further comprising yellow boy, being a form of iron oxyhydroxides produced by microorganisms from mine-drainage wastes and the treatment thereof, from about 0.01% to 15%, by weight percent, of said composition.

7. A chemical composition in accordance with claim 1, further comprising a source of nitrates, being both a microbial electron acceptor and nutrient form of nitrogen, being one or more selected from the group consisting of sodium nitrate, sodium-potassium nitrate, and potassium nitrate, comprising from about 0.5% to 4%, by weight percent, of said composition.

8. A chemical composition in accordance with claim 1, further comprising a source of complex phosphates, being one or more selected from the group consisting of sodium hexametaphosphate, sodium trimetaphosphate and other biologically hydrolyzable ringed metaphosphates and linear polyphosphates, comprising from about 0.25% to 10%, by weight percent, of said composition.

9. A chemical composition in accordance with claim 1, further comprising a chelating agent, being one or more selected from the group consisting of citric acid, humic acid, fulvic acid, sodium citrate, nitrilotriacetic acid (NTA), and ethylenediaminetetraacetic acid (EDTA), from about 0.01% to 5%, by weight percent, of said composition.

10. A chemical composition in accordance with claim 1, wherein said source of iron comprises sponge iron particles, being a porous form of iron particles.

11. A chemical composition in accordance with claim 1, wherein said source of Mn(IV) is one or more selected from the group consisting of pyrolusite, psilomelane, manganese greensand and other minerals containing Mn(IV).

12. A chemical composition in accordance with claim 1, wherein the proportion of the said source of manganese (IV) to the said particulate source of iron is in the range of from 0.01 to 0.75, by weight.

13. A chemical composition in accordance with claim 1, further comprising a binding agent, being one or more selected from the group consisting of plant-derived materials, starch, molasses, barley malt extract, corn syrup, glycerin, gelatine, bentonite, montmorillonite, kaolinite, calcium carbonate, and portland cement, from about 0.1% to 7%, by weight percent, of said composition.

14. A chemical composition in accordance with claims 1, 2, 3, 4, 5, 6, 7, 8, 9, 10, 11, 12 or 13, wherein any said embodiments of said composition are prepared in the form of briquettes, granules, pellets, tablets, capsules or combinations thereof.

15. A method for the anaerobic bioremediation and chemical reduction of chemical contaminants in contaminated media, being one or more of the group consisting of industrial wastes, solid wastes, hazardous wastes, sludges, liquid wastes, soils, sediments, aqueous sediments, ground waters, and surface waters, comprising the application of any said embodiments of said solid-chemical composition of claims 1, 2, 3, 4, 5, 6, 7, 8, 9, 10, 11, 12 or 13, at a rate from about 0.05 to 500 grams of said composition per Kg of said contaminated media, by weight.

16. A method for the remediation of contaminated ground water, comprising the application of any said embodiments of said solid-chemical composition of claims 1, 2, 3, 4, 5, 6, 7, 8, 9, 10, 11, 12 or 13, within a semi-permeable reactive barrier.

17. A method for the anaerobic biological treatment and chemical reduction of chemical contaminants in waste waters, industrial process waters, ground-waters, or surface waters, comprising the application of any said embodiments of said solid-chemical composition of claims 1, 2, 3, 4, 5, 6, 7, 8, 9, 10, 11, 12 or 13, in a water-treatment system or process.

18. A method for environmental remediation, whereby the application of said embodiments of said solid-chemical composition of claims 1, 2, 3, 4, 5, 6, 7, 8, 9, 10, 11, 12 or 13, to contaminated waste or environmental media is supplemented with a liquid-chemical composition comprising a mixture of water with one or more selected from the group consisting of nitrates, nitrites, nitrous oxides, phosphates, surfactants, alcohols, vegetable oils, mineral oils, sugars, starches, corn syrup, barley malt extract, molasses, humic acids, fulvic acids, chelating agents, and acidifying agents.

* * * * *